United States Patent [19]

Slysh

[11] 3,940,891
[45] Mar. 2, 1976

[54] CONICAL STRUCTURE
[75] Inventor: Paul Slysh, San Diego, Calif.
[73] Assignee: General Dynamics Corporation, San Diego, Calif.
[22] Filed: Aug. 5, 1974
[21] Appl. No.: 495,029

[52] U.S. Cl. .................... 52/82; 52/630; 244/119; 244/120
[51] Int. Cl.² ........................................ E04C 2/38
[58] Field of Search ......... 52/630, 82; 244/119, 120

[56] References Cited
UNITED STATES PATENTS

| | | | |
|---|---|---|---|
| 682,104 | 9/1901 | Middleton | 248/20 |
| 1,766,961 | 6/1930 | Steuart | 244/119 |
| 1,818,423 | 8/1931 | Mammert | 244/119 |
| 1,894,011 | 1/1933 | Wallis | 244/119 |
| 2,060,387 | 11/1936 | Wallis | 244/119 |
| 2,157,042 | 5/1939 | Wallis | 244/131 |
| 2,458,686 | 1/1949 | Davie | 52/630 |
| 2,639,876 | 5/1953 | Misfeldt | 52/630 |
| 2,952,341 | 9/1960 | Weiler | 52/630 |
| 3,579,942 | 5/1971 | Cole | 52/617 |

FOREIGN PATENTS OR APPLICATIONS

| | | | |
|---|---|---|---|
| 850,621 | 9/1939 | France | 244/120 |
| 577,154 | 5/1946 | United Kingdom | 244/119 |
| 47,113 | 3/1932 | Denmark | 52/82 |

OTHER PUBLICATIONS

The Isogrid; Machine Design, Apr. 19, 1973.
Architectural Record, Nov. 1955, p. 235.

Primary Examiner—Ernest R. Purser
Assistant Examiner—Henry Raduazo
Attorney, Agent, or Firm—John R. Duncan

[57] ABSTRACT

A high strength frusto-conical or conical structure utilizing an integral flanged reinforcing grid is disclosed. The structure comprises a skin plate having a generally conical shape, with a plurality of upstanding integral ribs. At least some of the ribs are configured in evenly spaced right and left spirals. Other ribs may extend along conic generatrix intersecting the spiral ribs at points where right and left spiral ribs intersect. Each rib includes a narrow flange at the inner edge, lying substantially parallel to the skin.

9 Claims, 9 Drawing Figures

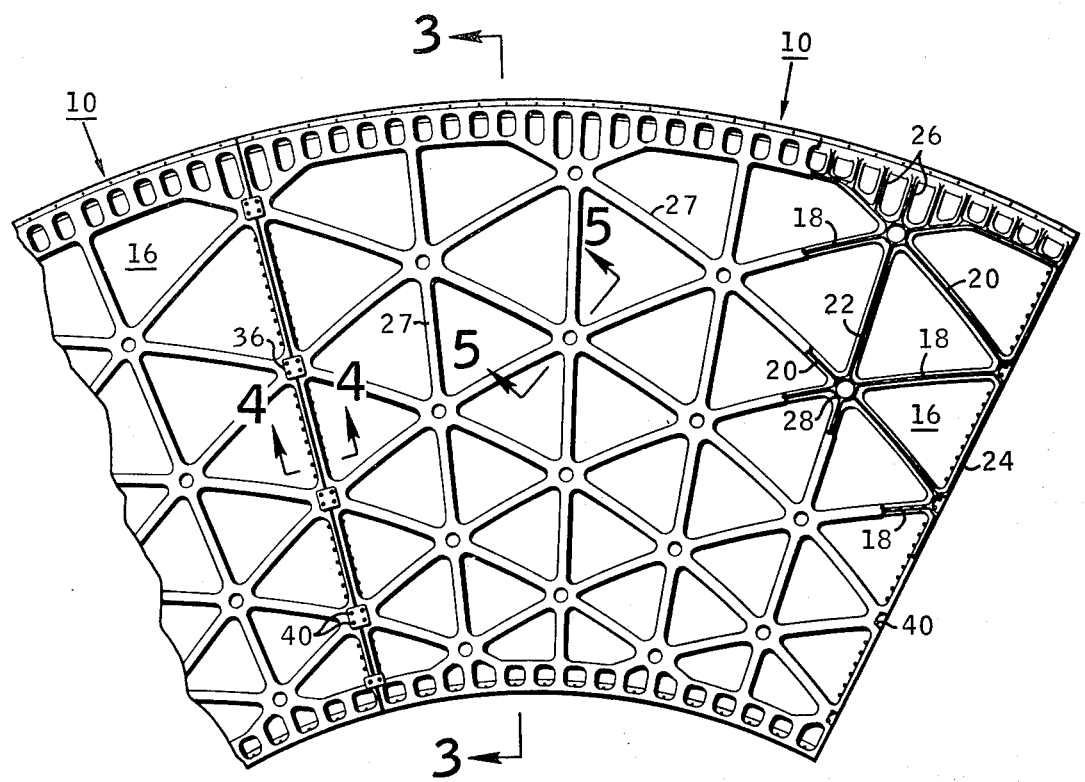
FIG. 2
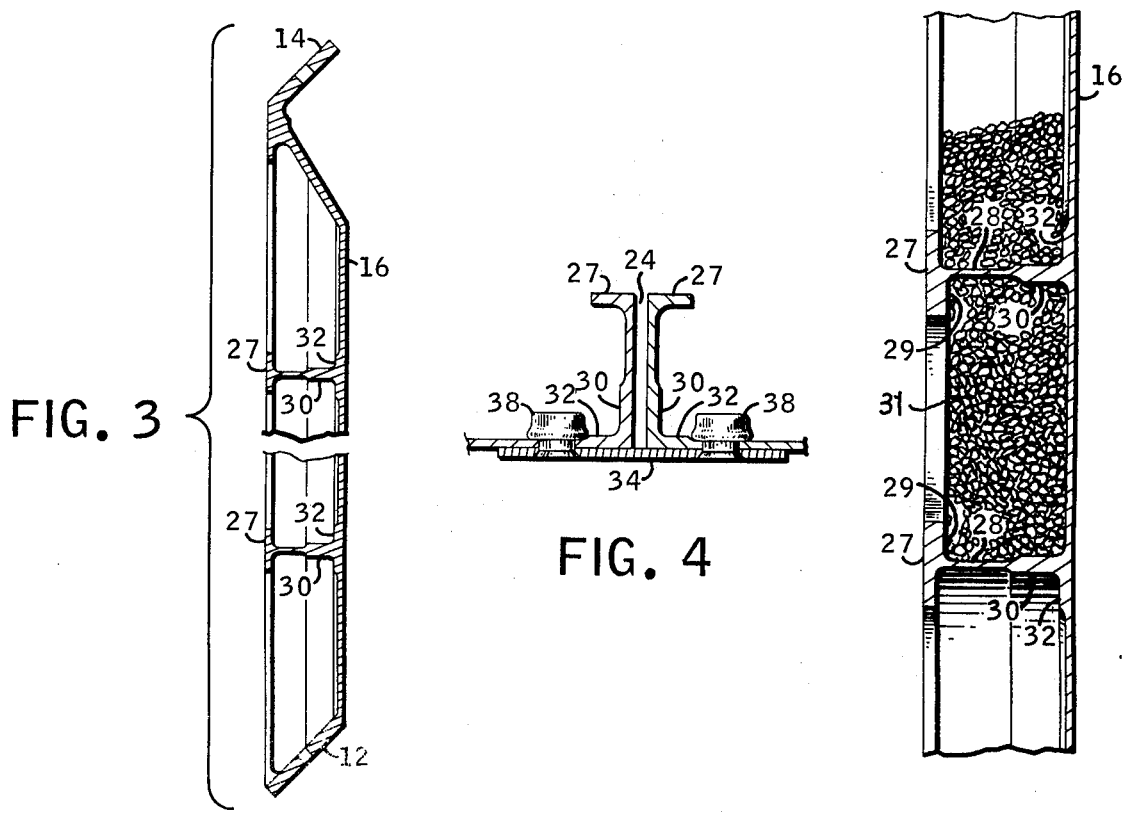
FIG. 3
FIG. 4
FIG. 5

CONICAL STRUCTURE

BACKGROUND OF THE INVENTION

This invention relates in general to conical structures and, more specifically, to high strength conical structures with a reinforcing rib construction.

In most metallic structures, such as buildings, large tanks, vehicles including automobiles, aircraft, etc., the exterior structure consists of a metal sheet skin mounted on a supporting frame comprising load carrying stringers. In some cases, the skin is stressed to increase the structure load carrying capacity. Such arrangements are complex and difficult to assembly in a manner providing truly uniform load carrying ability, but are often satisfactory for applications which do not require high strength in combination with low weight. Also, these structures generally do not efficiently distribute structural stresses under load, particularly impact loads.

In many applications, such as aerospace vehicles, a high strength-to-weight ratio is necessary in large, complex structures. Often structures such as aircraft fuselages, space launch vehicles, spacecraft, etc., are constructed from large, shaped, skin panels attached to elaborate stringer and reinforcement systems. These structures are complex, heavy, and do not possess uniform properties.

A high strength-to-weight ratio is especially difficult to achieve in structures which must have thin skin-plus-support thickness to permit effective use of the largest possible internal volume. This problem occurs in structures such as frusto-conical space launch vehicle interstage adapters, which may be filled with electronics and propulsion-related items, in conical pedestals or enclosures for military equipment, etc.

Thus, there is a continuing need for thin-walled conical structures of improved strength, high strength-to-weight ratios, and exceptional stress distribution under load.

It is, therefore, an object of this invention to provide a conical or frusto-conical structure having improved strength-to-weight characteristics.

Another object of this invention is to provide a thin-walled conical structure having improved stress distribution characteristics.

SUMMARY OF THE INVENTION

The improved structure of this invention comprises, basically, a skin in a generally conical configuration with a plurality of integral upstanding, inwardly or outwardly directed ribs. At least some of the ribs are configured as evenly spaced, intersecting, right and left spirals. Other ribs preferably extend along generatrix of the cone and intersect the spiral ribs at points where right and left spiral ribs intersect. Preferably, each rib carries a narrow flange at its upper edge, the flange being generally parallel to the skin.

The conical structure may be formed in one piece or from a plurality of radial sections, or panels, which are secured together by any suitable means to form the overall structure. For the purposes of this application "conical" includes a cone or any portion of the surface of a cone, such as a frustum.

Where the conical structure is made up of a plurality of panels, the panels when assembled will produce a conical structure having the above-described rib configuration. The panels may be secured together in any suitable manner. Typical fasteners include bolts, rivets, welding, or any combination thereof. Splice plates or strips may be placed over the line between contiguous panels and may be secured thereto.

Any suitable material may be formed into the novel structure of this invention. Typical materials include metals, ceramics, plastics, etc. For aerospace application, aluminum, titanium and advanced composites (e.g., boron/aluminum, graphite/epoxy) are generally preferred for their high strength-to-weight ratios.

The panels and structure may be shaped by any suitable method. Typical methods include milling (both with machine tools and chemical milling), forming, diffusion molding, casting, or any combination thereof. With aluminum and titanium, it is preferred that the ribs be formed by milling a flat plate, which is then brake-formed into the final structural shape, as is detailed below.

BRIEF DESCRIPTION OF THE DRAWING

Further details of the invention, and certain preferred embodiments thereof, will be further understood upon reference to the drawing, wherein:

FIG. 2 is an interior elevation view of portions of two panels (somewhat flattened and in part cut-away for clarity) which make up the conical structure;

FIG. 3 is a sectional view taken on line 3—3 in FIG. 2;

FIG. 4 is a sectional view taken on line 4—4 in FIG. 2;

FIG. 5 is a sectional view taken on line 5—5 in FIG. 2;

DETAILED DESCRIPTION OF THE INVENTION

Figure 1:
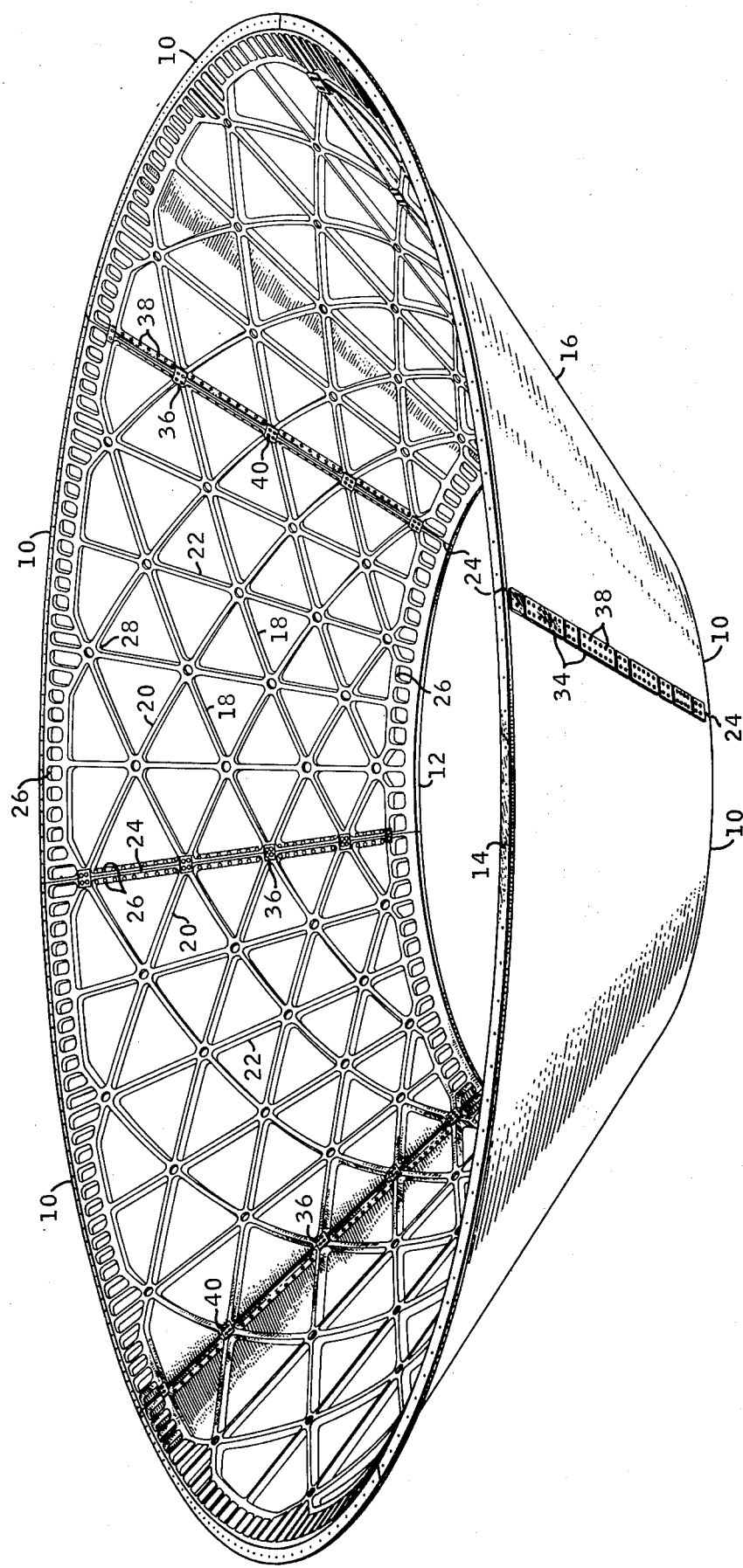
FIG. 1 is a perspective view of the conical structure of this invention.

Referring now to FIG. 1, there is seen a conical structure, in this case frusto-conical in shape, which might typically serve as an inter-stage adapter between two cylindrical stages of a space launch vehicle. Various electronic components, propulsion equipment, etc., may be mounted within the adapter, which has a large, clear span. The structure is made up of a plurality of panels 10. The upper and lower rims are provided with flanges 12 and 14, respectively, to provide means for securing the conical structure to adjacent structures. These flanges 12 and 14 are further detailed in FIG. 3. If desired, a plurality of reinforcing webs perpendicular to flange 14 may be provided between flanges 14 and skin 16, at the upper end of FIG. 3.

Each panel 10 comprises an outer skin 16 having a plurality of upstanding, inwardly extending ribs. While the embodiment shown uses inwardly extending ribs, if desired, the skin could be on the inside of the cone, with the ribs extending outwardly. These ribs include ribs 18 which lie along a right spiral, ribs 20 which lie along a left spiral, and ribs 22 which lie along conical generatrix and intersect ribs 18 and 20 only at points where ribs 18 and 20 intersect. The ribs then form a pattern of triangles bounded by one straight and two curved ribs. The curved ribs 18 and 20 are described by an spiral according to the equation: $R_2 = R_1 \exp(\pi\theta/6)$, where $R_1$ and $R_2$ are radii from the cone apex to selected points 1 and 2 on the curve and $\theta$ is the angle at the cone apex between the radii vectors $R_1$ and $R_2$ in radians. Since the slope of the equation with respect to a radius vector is constant, all corner angles at the intersections of the developed rib pattern are 60°. One generatrix rib also lies along each panel edge 24. A series of ribs 26 forming small, approximately rectangular pockets is provided adjacent to the upper and lower panel rims. A circular pocket 28, as seen in FIGS. 2 and 5, is provided at each intersection of ribs 18, 20 and 22.

Ribs 18, 20 and 22 each include a narrow flange 27 on the inner end, as best seen in FIGS. 3, 4 and 5. Also, the base portion 30 of each rib is preferably slightly thickened. The skin 16 is also preferably slightly thickened at 32 adjacent to the ribs on one or both sides of each rib to form an I-beam-like condition. As seen in FIG. 5, part of the I-beam flange 32 integral with the skin and inside the pocket 28 is preferably eliminated and the inner lip of the flange 27 is thickened at 29 to optimize stress distribution in the node since the skin is not designed to elastically buckle.

In some cases it is advantageous to include thermal insulation material in the conical structure. The pockets or spaces between the webs surrounding pockets 28 which are overlapped along the edges by flanges 27 are uniquely suited to constraining sheets or masses of insulating material. Typically, these spaces may be filled to the level of flanges 27 with a foamed-in-place insulation 31, which will be locked in place by those flanges as shown in FIG. 5 only. Alternately, blocks of foam, batts of multi-layer insulation, etc., may be inserted into and similarly retained in those spaces.

Adjacent panels are secured together by splice plates 34 which cover the inter-panel gap along the outside of the structure and by plates 36 which cover adjacent rib intersection points on the inside of the panels. While these plates 34 and 36 may be fastened to the structure by any suitable means, such as rivets, spot welds, bolts, etc., splice plates 34 are preferably secured to panels 10 with a series of rivets 38, and plates 36 are preferably secured to panels 10 by huck bolts 40. Splice plates 34 are preferably made in sections to avoid hard-point loads at the mounting rim flanges 12 and 14.

The nodes or pockets 28 provide novel attachment points for a variety of auxiliary support means which cooperate with the overall conical structure. A typical support structure which utilizes pockets 28 as attachment points is shown in FIGS. 6 and 7.

Figure 6:
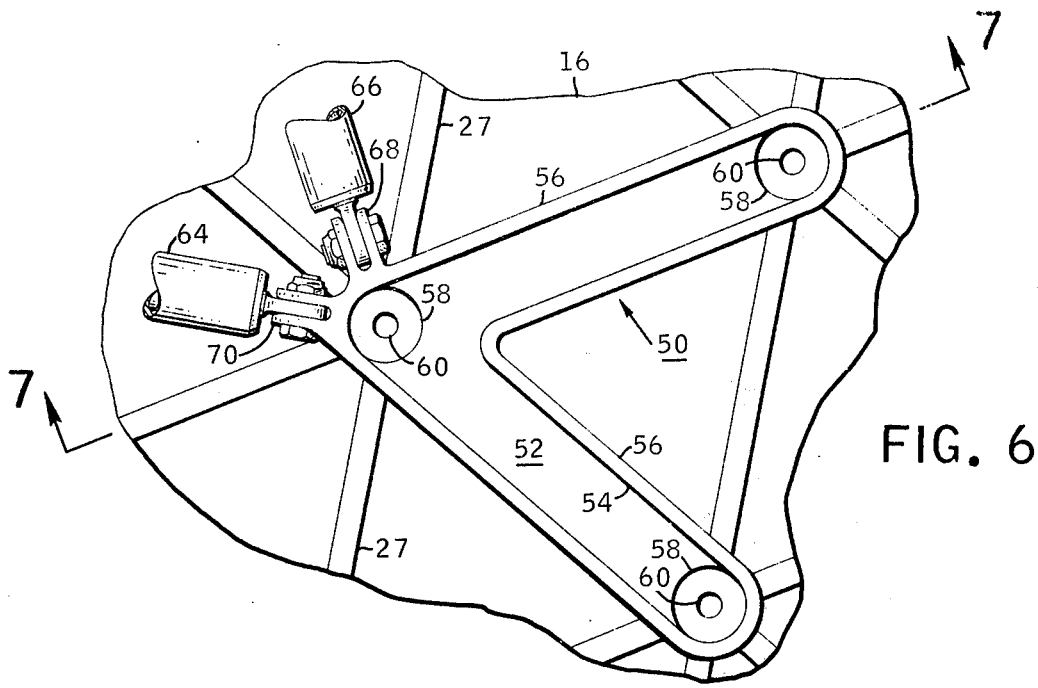
FIG. 6 is a plan view of a portion of the conical structure illustrating a fixture support member.
Figure 7:
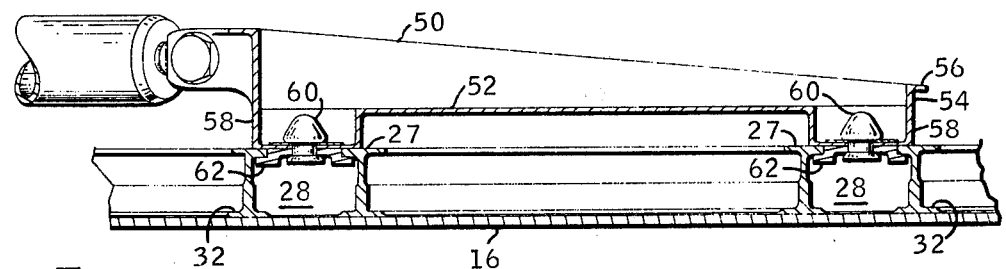
FIG. 7 is a sectional view taken on line 7—7 in FIG. 6.

As seen in FIGS. 6 and 7, support member 50 consists primarily of a V-shaped clevis plate 52, upstanding webs 54 along the edges of plate 52 and an outwardly-directed flange 56 along the upper edges of webs 54. Above each pocket 58, structure 50 includes a downwardly extending, generally cylindrical extension ending in a circular member 58, which rests on flange 27 around pocket 28. An attachment means, such as huck bolt 60, extends through a hole in the base of extension 58 and connects to an attachment fitting 62. Fitting 62 is a narrow strip, as shown in FIG. 9, to facilitate insertion into pocket 28 before bolt 60 is tightened. In the embodiment shown in FIGS. 6-8, the I-beam flange 32 integral with skin 16 is used on both sides of the web for added strength.

The device or mechanism being supported by support means 50, here a pair of struts 64 and 66, are attached to means 50 by a pair of conventional bolted fittings 68 and 70. As is apparent from these figures, the uniform repeating pattern of pockets 28 across the conical structure provides a number of identical attachment points for support members mounted in the manner illustrated in FIGS. 6 and 7. The grid surface is similar to a "peg board" in that standard fittings can be rapidly and easily connected to the overall structure at any of a number of locations. Since the grid can be formed on either the inner or outer surface of skin 16, these fittings may typically mount electronic or other mechanisms within the conical structure or may be used for outside attachments supporting the conical structure within a larger structure. For example, as illustrated in FIGS. 8 and 9, the circular pockets and cooperating fittings may be used to mount springs which could flexibly support a tank within the conical structure or, on the outside, flexibly support the conical structure within a larger structure.

Figure 8:
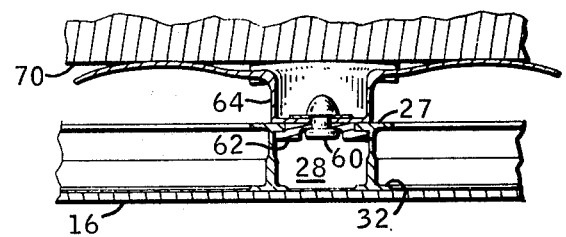
FIG. 8 is a sectional view through a portion of a conical structure illustrating a spring support means.
Figure 9:
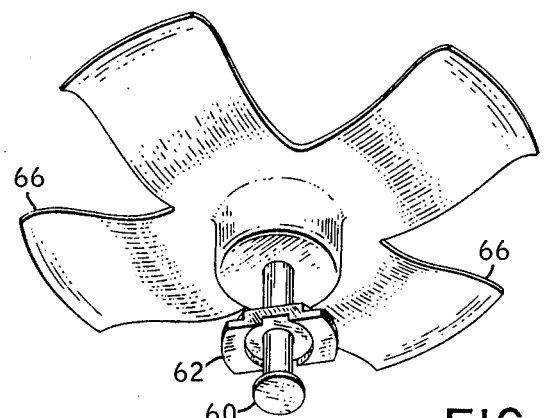
FIG. 9 is a perspective view of a spring support means useful with the conical structure.

As seen in FIGS. 8 and 9, an attachment fitting 62 is slipped into pocket 28 and under flanges 27, then the circular base of cup-shaped member 64, having a number of outwardly extending spring arms 66, is secured to fitting 62 by a rivet, bolt or other means such as huck bolt 60. Spring arms 66 deflect when a surface 70 is forced thereagainst.

Thus, it can be seen that the conical structure of this invention together with the cooperating fittings, provides a strong, lightweight, adaptable and versatile structure suitable for many applications.

While, as discussed above, the conical structure of this invention may be manufactured by a number of processes, a preferred method has been developed for producing the structure from aluminum or other metal plates.

In the preferred method, a metal plate having the thickness of the final panel is positioned in a numerical control milling machine and the material within the pockets is milled away. Where skins thinner than about 0.04 inch are desired, they are preferably milled to a greater thickness, then are chemically milled to final thickness. Webs, flanges and other features are protected by masking during chemical milling. Conventional "T-slot" type milling cutters are used to remove the undercut portions between the rib flanges 27 and skin 16. When machining is complete, the pockets are filled with a removable solid material, such as "Rigidax" low melting epoxy filler material available from M. Argueso and Co., Mamaroneck, New York. The panel is rolled or brake formed to the desired contour. The filler is removed by heating the panel above the filler melting temperature. The panel is then clamped to a fixture of the desired contour and aged. If desired, the panel may be stretch formed either with or without the filler material in place. The panels are then secured together to produce the desired conical structure.

While certain specific materials and structural arrangements have been detailed in the above description of preferred embodiments of the structure of this invention, these may be varied or other components used, as described above, where suitable, with similar results. Other applications and variations of the present invention will occur to those skilled in the art upon reading this disclosure. These are intended to be included within the scope of this invention, as defined in the appended claims.

I claim:

1. A high strength conical structure comprising:
   at least one skin sheet configured as a section of a conical surface;
   a first plurality of upstanding ribs of substantially equal height extending away from said skin sheet and integral therewith;
   said first plurality of ribs configured in evenly spaced alternately right and left spirals said right and left spirals being defined by the equasion $$R_2 = R_1 \exp\left(\frac{\pi\theta}{6}\right)$$

wherein $R_1$ and $R_2$ are radii from the cone apex to selected points 1 and 2 on the spiral and $\theta$ is the angle at the cone apex between the radii vectors $R_1$ and $R_2$ in radians.
   a second plurality of upstanding ribs of substantially even height with said first plurality of ribs extending away from said skin sheet and integral therewith;
   said second plurality of ribs extending along conic generatrix and intersecting said first plurality of ribs only at points of intersection and between right and left spiral ribs;
   narrow flanges at the inner edge of each of said first and second plurality of ribs, said flanges being substantially parallel to said skin; and
   a circular node pocket bounded by a circular flanged rib at the intersections of said first and second pluralities of ribs.

2. The structure according to claim 1 further including means to fasten a plurality of conical surface sections together to provide a unitary conical structure; said means including internal and external splice plates bridging adjacent sections.

3. The structure according to claim 2 further including means at the conic apex and base edges of said structure adapted to permit connection to other structures.

4. The structure according to claim 1 further including a layer of insulation material in contact with said skin and substantially filling the spaces between said ribs.

5. The structure according to claim 1 further including at least one support means overlying at least one of said circular flanges having a generally circular member in contact with said circular rib, a removable attachment fixture within said pocket bridging said pocket and contacting the under surface of said circular flange and bolt means between said circular member and said fitting to clamp them together with said circular flange therebetween.

6. The structure according to claim 5 wherein said support means includes a plurality of said circular members spaced apart distances equal to the spacing of said pockets, whereby said support means may be simultaneously clamped to a plurality of said circular rib flanges.

7. The structure according to claim 1 further including at least one flexible support means overlying at least one of said circular flanges, each of said flexible support means comprising:
   a generally circular member in contact with the outer surface of said circular flanges;
   said circular member having at least two spring arms extending radially outwardly of said circular member and inwardly of said conical structure;
   said spring arms being unattached at their outer ends but adapted to contact and flexibly support an adjacent object surface;
   a generally bar-shaped attachment fixture within said pocket in contact with the under surface of said circular flange; and
   bolt means engaging said circular member and said fixture to clamp them together with said circular flange therebetween.

8. A high strength conical structure comprising:
   at least one skin sheet configured as a section of a conical surface;
   a first plurality of inwardly upstanding ribs of substantially equal height extending away from said skin sheet and integral therewith;
   said first plurality of ribs configured in evenly spaced alternately right and left spirals, said right and left spirals being defined by the equasion $$R_2 = R_1 \exp\left(\frac{\pi\theta}{6}\right)$$

wherein $R_1$ and $R_2$ are radii from the cone apex to selected points 1 and 2 on the spiral and $\theta$ is the angle at the cone apex between the radii vectors $R_1$ and $R_2$ in radians;
   a second plurality of upstanding ribs of substantially even height with said first plurality of ribs extending away from said skin sheet and integral therewith;
   said second plurality of ribs extending along conic generatrix and intersecting said first plurality of ribs only at points of intersection between right and left spiral ribs;
   narrow flanges at the inner edge of each of said first and second plurality of ribs, said flanges being substantially parallel to said skin;
   said skin being thicker along a strip adjacent and parallel to the rib bases so that each rib, flange and thickened strip combine to present an I-beam like cross-section configuration; and
   at least some of said ribs having a greater thickness near said skin than near said flanges.

9. A high strength conical structure comprising:
   at least one skin sheet configured as a section of a conical surface;
   a first plurality of inwardly upstanding ribs of substantially equal height extending away from said skin sheet and integral therewith;
   said first plurality of ribs configured in evenly spaced alternately right and left spirals, said right and left spirals being defined by the equasion $$R_2 = R_1 \exp\left(\frac{\pi\theta}{6}\right)$$

wherein $R_1$ and $R_2$ are radii from the cone apex to selected points 1 and 2 on the spiral and $\theta$ is the angle at the cone apex between the radii vectors $R_1$ and $R_2$ in radians;
   a second plurality of inwardly upstanding ribs of substantially even height with said first plurality of ribs extending away from said skin sheet and integral therewith;

said second plurality of ribs extending along conic generatrix and intersecting said first plurality of ribs only at intersections between right and left spiral ribs;

narrow flanges at the inner edge of each of said first and second plurality of ribs, said flanges being substantially parallel to said skin;

a circular node pocket bounded by a circular flanged rib at the intersections of said first and second pluralities of ribs; and a plurality of support means engaging a plurality of the circular flanges, at least two of said support means secured to an object to be mounted on said structure and spaced apart a distance equal to the spacing of said pockets, each of said support means comprising:

a circular member in contact with the outer surface of said circular flange and secured to said object;

a generally bar-shaped attachment fixture within said pocket in contact with the under surface of said circular flange; and bolt means engaging said circular member and said fixture to clamp them together with said circular flange therebetween.

* * * * *